United States Patent [19]

Micciche

[11] Patent Number: 5,275,767
[45] Date of Patent: Jan. 4, 1994

[54] MANUFACTURE OF PLASTIC CONTAINERS

[76] Inventor: Frank S. Micciche, 83 Clover Ave., Floral Park, N.Y. 11001

[21] Appl. No.: 717,633

[22] Filed: Jun. 19, 1991

[51] Int. Cl.$^5$ .................. B29C 57/10; B29C 65/08
[52] U.S. Cl. ........................................ 264/23; 156/69;
156/73.1; 156/293; 156/580.2; 264/248;
264/296; 264/322
[58] Field of Search ............... 264/23, 248, 296, 322;
156/69, 73.1, 580.2, 293

[56] References Cited

U.S. PATENT DOCUMENTS

| | | | |
|---|---|---|---|
| 3,509,252 | 4/1970 | Baehr | 264/296 |
| 3,929,943 | 12/1975 | Klimaszewski, Jr. | 264/322 |
| 3,972,758 | 8/1976 | Bieber | 156/69 |
| 4,140,058 | 2/1979 | Ballreich et al. | 156/73.1 |
| 4,219,525 | 8/1980 | Greenspan | 264/296 |
| 4,350,649 | 9/1982 | Summo | 264/23 |
| 4,364,783 | 12/1982 | Theodore et al. | 264/23 |
| 4,411,720 | 10/1983 | Sager | 156/69 |
| 4,681,645 | 7/1987 | Fukushima et al. | 156/580.2 |
| 4,719,069 | 1/1988 | Reymann et al. | 264/296 |
| 4,767,478 | 8/1988 | Christine | 156/293 |
| 4,984,415 | 1/1991 | Kuroda | 156/69 |

Primary Examiner—Jan H. Silbaugh
Assistant Examiner—Brian J. Eastley
Attorney, Agent, or Firm—Donald S. Dowden

[57] ABSTRACT

A container is manufactured by placing a length of extruded thermoplastic tubing over a mandrel so that an end of the tubing extends beyond the mandrel to form an annular rim and placing a thermoplastic slug on the mandrel within the rim. An ultrasonic resonating horn is provided having a cavity adapted to receive the rim. The horn cavity has a base and an annular tapered portion formed around the base and engageable with the rim. The tubing and the resonating horn are pressed together with a relatively moderate force so that the tapered portion of the horn cavity engages the rim of the tubing and softens and folds it inwardly in such a manner that it is in alignment with the slug, the mandrel, and the base of the cavity. The mandrel and the resonating horn are then brought together with a relatively large force to squeeze the folded rim and the slug tightly together between the mandrel and the base of the cavity. Ultrasonic waves propagated from the horn into the folded rim and the slug fuse the rim and the slug together to form a watertight seal at the end of the tubing. Thereafter, a different mandrel and a different ultrasonic resonating horn are employed to fuse a stand to the sealed end of the tubing.

3 Claims, 3 Drawing Sheets

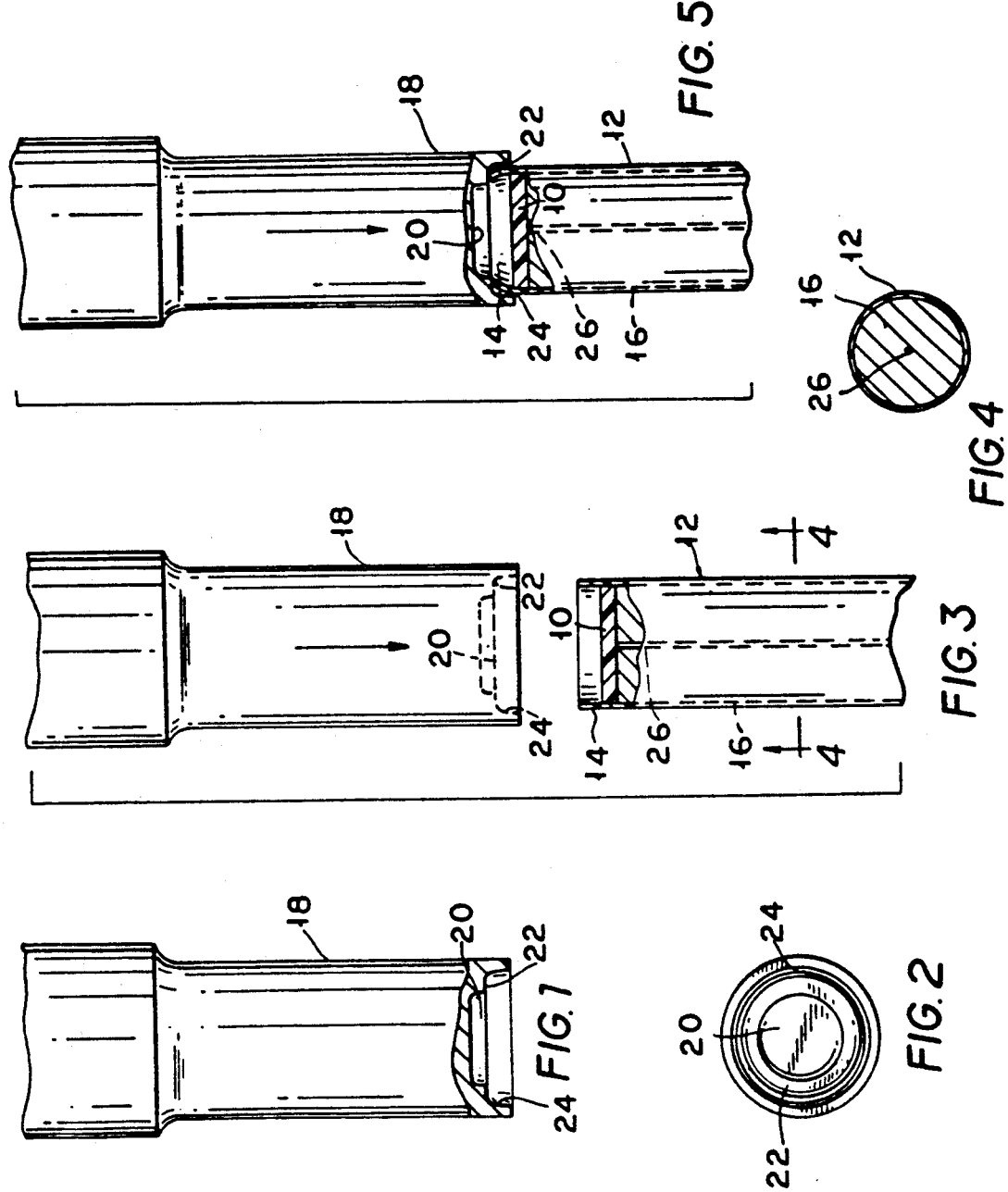

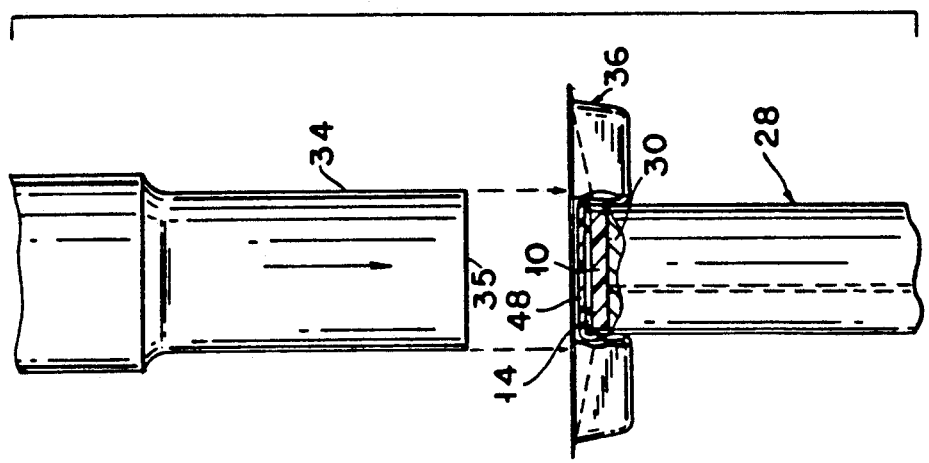
FIG. 9
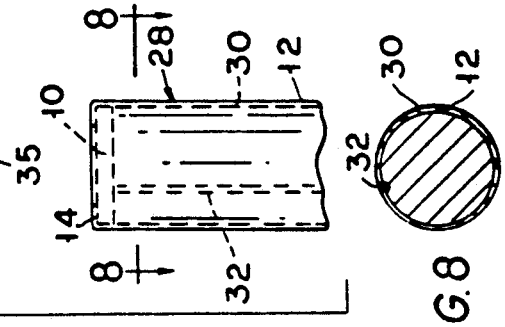
FIG. 8
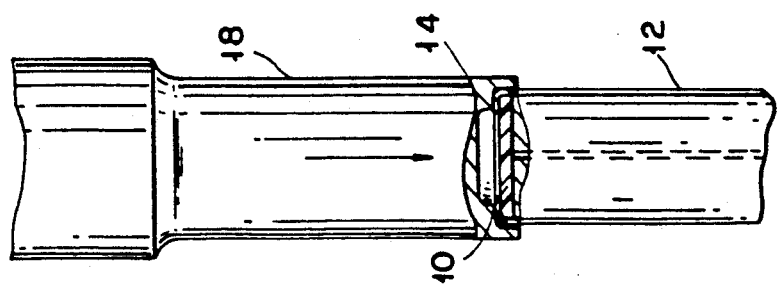
FIG. 7
FIG. 6

MANUFACTURE OF PLASTIC CONTAINERS

BACKGROUND OF THE INVENTION

1. Field of the Invention

This invention relates to the manufacture of containers and more particularly to a novel and highly effective method and apparatus enabling the manufacture of inexpensive containers for liquids and to containers produced by the method and apparatus. The containers are especially adapted for use in the laboratory.

2. Description of the Prior Art

The manufacture of containers including containers for liquids has of course been known for thousands of years. However, the manufacture of containers continues to evolve because of an unmet need for containers that are inexpensive enough to be disposable yet conform to a number of stringent standards. Among the standards are precise control of container volume; the ability to accept writing, calibration marks, etc.; the ability to stand upright; the ability to pour liquids without dribbling down the outside of the container; color; transparency, translucence or opacity; resistance to attack by various solvents, acids and bases; resistance to oxidation in the atmosphere; resistance to breakage; the ability to withstand extremes of temperature; and, of course, a watertight construction to prevent undesirable leakage.

To meet these needs, increasing use has been made of plastics in recent decades. Plastics are generally inexpensive and possess many properties that render them suitable for use in the manufacture of containers, including containers for use in the laboratory. Moreover, efficient techniques for making containers from a plastic are known. In particular, the use of ultrasonic welding to seal plastics is known. For example, a Sager U.S. Pat. No. 4,411,720 discloses an ultrasonic welding method for sealing a thermoplastic cap to the neck of a thermoplastic container. However, the prior art does not provide a container that is made of inexpensive plastic by a process employing ultrasonic welding and that meets all of the needs of modern laboratories.

OBJECTS AND SUMMARY OF THE INVENTION

An object of the invention is to provide a remedy for the problems of the prior art outlined above and in particular to provide a container that is inexpensive enough to be disposable yet has a bottom that is reliably watertight and a volume that is precisely controlled; that accepts writing, calibration marks, etc.; stands upright without the aid of a test tube holder or rack or similar structure; and in general meets all of the stringent standards for containers mentioned above. Another object of the invention is to provide a novel method and apparatus for the efficient manufacture of the container. Another object of the invention is to provide a manufacturing method and apparatus by virtue of which ultrasonic welding produces a seal or weld that is more uniform and effective than that attainable by means of ultrasonic welding as practiced heretofore.

The foregoing and other objects are attained in accordance with the invention by the provision of a method of making a container, the method comprising the steps of: placing a thermoplastic slug within a length of extruded thermoplastic tubing, the tubing having an end that extends beyond the slug to form an annular rim; folding the rim inwardly so that it overlaps the slug; squeezing the folded rim and the slug tightly together; and heating the folded rim and slug to fuse the rim and the slug together and form a watertight seal at the end of the tubing.

In accordance with an independent aspect of the invention, there is provided a method of making a container for liquids, the method comprising the steps of: effecting a relative movement between a length of extruded thermoplastic tubing, a thermoplastic slug, and a mandrel that results in the tubing being positioned around the mandrel, the tubing having an end that extends beyond the mandrel to form an annular rim, and the slug being supported by the mandrel within the rim; providing an ultrasonic resonating horn having a cavity adapted to receive the rim, the horn cavity having a base and an annular tapered portion formed around the base and engageable with the rim; pressing the tubing and the resonating horn together with a relatively moderate force so that the tapered portion of the horn cavity engages the rim of the tubing and folds it inwardly in such a manner that it is in alignment with the slug, the mandrel, and the base of the cavity; pressing the mandrel and the resonating horn together with a relatively large force to squeeze the folded rim and the slug tightly together between the mandrel and the base of the cavity; and propagating ultrasonic waves from the horn into the folded rim and the slug to fuse the rim and the slug together and form a watertight seal at the end of the tubing.

In accordance with another independent aspect of the invention, there is provided apparatus for making a container for liquids, the apparatus comprising: a mandrel over which a length of extruded thermoplastic tubing can be placed and on which a thermoplastic slug can be placed in such a manner as to leave an end of the tubing extending beyond the slug to form an annular rim; and an ultrasonic resonating horn having a cavity adapted to receive the rim, the horn cavity having a base and an annular tapered portion formed around the base and engageable with the rim; whereby pressing the tubing and the resonating horn together with a relatively moderate force causes the tapered portion of the horn cavity to engage the rim of the tubing and fold it inwardly in such a manner that it is in alignment with the slug, the mandrel and the base of the cavity and then pressing the mandrel and the resonating horn together with a relatively large force squeezes the folded rim and slug tightly together between the mandrel and the base of the cavity; and whereby ultrasonic waves propagated from the horn into the folded rim and the slug fuse the rim and the slug together and form a watertight seal at the end of the tubing.

BRIEF DESCRIPTION OF THE DRAWING

A better understanding of the objects, features and advantages of the invention may be gained from a consideration of the following detailed description of the preferred embodiments thereof, in conjunction with the appended figures of the drawing, wherein a given reference character always represents the same element or part and wherein:

FIG. 1 is a view in side elevation of apparatus constructed in accordance with the invention for manufacturing a container in accordance with the invention;

FIG. 2 is a bottom plan view of the apparatus of FIG. 1;

FIG. 3 is a view in side elevation of the apparatus of FIGS. 1 and 2 employed in conjunction with a length of tubing, a slug for forming the bottom of the tubing, and a mandrel for supporting the slug and over which the tubing is placed;

FIG. 4 is a sectional view taken along the line 4—4 of FIG. 3 and looking in the direction of the arrows;

FIG. 5 is an elevational view showing a stage of the manufacture following the stage shown in FIG. 3;

FIG. 6 is an elevational view showing a stage of the manufacture following the stage shown in FIG. 5;

FIG. 7 is an elevational view showing the length of tubing and the slug as processed at the end of the stage shown in FIG. 6, a different ultrasonic resonating horn and a different mandrel having been substituted for the ones shown in FIG. 6;

FIG. 8 is a sectional view taken along the line 8—8 of FIG. 7 and looking in the direction of the arrows;

FIG. 9 is an elevational view showing a further manufacturing step in which the container as processed at the end of the stage shown in FIG. 7 is permanently joined by ultrasonic welding to a plastic stand;

DESCRIPTION OF THE PREFERRED EMBODIMENTS

Figure 13:
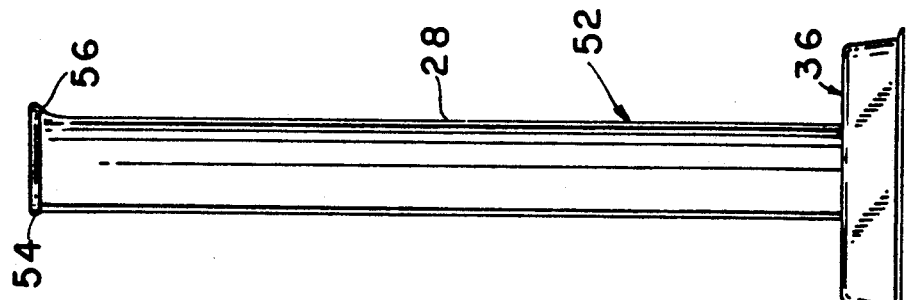
FIG. 13 is a view in side elevation of the completed container joined to its stand.

The figures disclose a method of making a container, apparatus for practicing the method, and the completed container. In accordance with the invention, a thermoplastic slug 10 is placed within a length of extruded thermoplastic tubing 12. The tubing 12 has an end that extends beyond the slug 10 to form an annular rim 14. As explained in detail below, the rim 14 is folded inwardly so that it overlaps the slug 10, and the folded rim 14 and the slug 10 are squeezed tightly together and heated to fuse the rim 14 and slug together and form a watertight seal at the end of the tubing 12.

In more detail, a method of making a container for liquids in accordance with the invention comprises the steps of effecting a relative movement between a length of extruded thermoplastic tubing 12, a thermoplastic slug 10, and a mandrel 16 so that the tubing 12 has an end that extends beyond the mandrel 16 to form an annular rim 14 within which the slug 10 is contained. The ultrasonic resonating horn 18 has a cavity 20 adapted to receive the rim 14. The horn cavity 20 has a base 22 and an annular tapered portion 24 formed around the base 22 and engageable with the rim 14.

The tubing 12 and resonating horn 18 are pressed together with a relatively moderate force so that the tapered portion 24 of the horn cavity 20 engages the rim 14 of the tubing 12 and folds it inwardly in such manner that it is in alignment with the periphery of the slug 10, the mandrel 16, and the base 22 of the cavity 20. The mandrel 16 and the resonating horn 18 are pressed together with a relatively large force to squeeze the folded rim 14 and the slug 10 tightly together between the mandrel 16 and the base 22 of the cavity 20. The mandrel 16 fits snugly within the tubing 12 and prevents deformation of the portion of the tubing 12 adjacent to and below the slug 10. Meanwhile, ultrasonic waves are propagated from the horn 18 into the folded rim 14 and the slug 10 to fuse the rim 14 and the slug 10 together and form a watertight seal at the end of the tubing 12.

The mandrel 16, shown for example in FIG. 3, has a centrally located, axially extending bore 26 that permits the escape of air during the molding process described above.

The product produced at the end of the stage of the manufacturing process shown in FIG. 6 is a container 28 having a bottom that is well sealed. Since a great deal of pressure is applied to the slug and folded rim while performing the ultrasonic welding, the container 28 may be used as-is with the assurance that it will hold liquids without any danger of leakage. It is preferred, however, in accordance with the invention, to add a stand to the container 28 so that, if the container 28 is relatively tall and thin it will nevertheless stand without support such as a test tube normally requires. In other words, it will be free-standing. Accordingly, in FIG. 7, the container 28 is placed over another mandrel 30 having an exterior, axially extending, air-vent groove 32 formed thereon. A horn 34 having a flat active end 35 is provided as indicated in FIG. 7. A stand 36 is provided as shown in FIG. 9.

Figure 12:
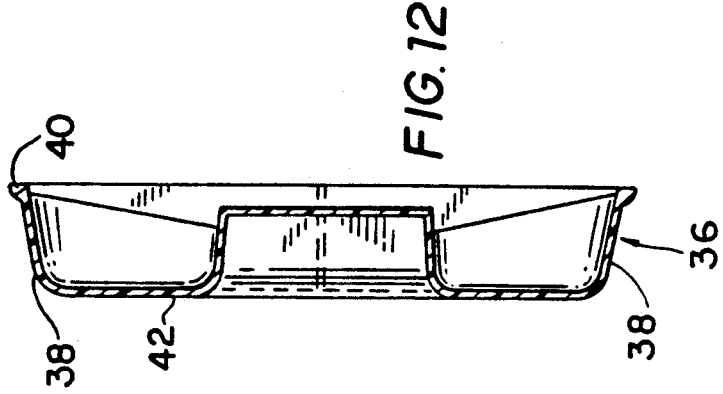
FIG. 12 is a sectional view taken along the line 12—12 of FIG. 10 and looking in the direction of the arrows.
Figure 10:
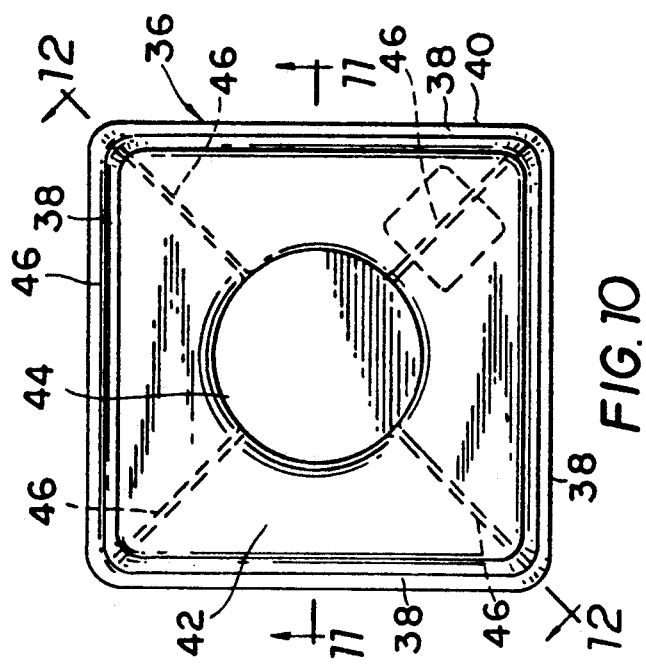
FIG. 10 is a top plan view of the stand of FIG. 9.
Figure 11:
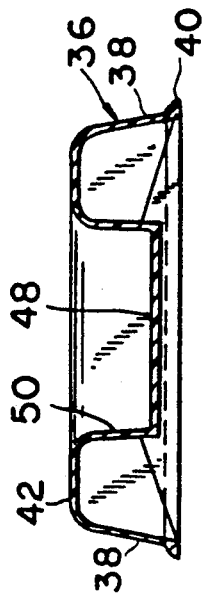
FIG. 11 is a sectional view taken along the line 11—11 of FIG. 10 and looking in the direction of the arrows.

As FIGS. 10-12 show, the stand 36 is generally square as seen in plan view and has side walls 38, a circumferential flange 40, a flat top surface 42, and a central recess 44. For reinforcement, it is provided also with ribs 46 extending between the central recess 44 and the corners of the square. The central recess 44 has a bottom wall 48 and a round side wall 50.

The central recess 44 is proportioned to receive the bottom of the container 28 snugly as indicated in FIG. 9. The horn 34 with the flat active surface 35 is applied to the bottom 48 of the stand 36, and ultrasonic waves are propagated into the injection-molded material of the stand 36 and the bottom of the container 28. This fuses or welds the stand 36 to the bottom of the container 28 and produces a completed container 52 comprising the stand 36 and container proper 28 as illustrated in FIG. 13. At the same time, the mandrel 30 prevents deformation of the bottom of the container 28 during the welding process despite the heat and pressure. The volume of liquid, etc., that can be contained by the completed container 52 is therefore not affected by the welding process. The completed container 52 is preferably formed in a conventional manner with a circumferential bead 54 at its upper end. A portion of the bead 54 forms at least a part of a pouring spout 56. The stand 36 supports the completed container 52 in an upright position with an open end of the container uppermost for ingress and egress of a liquid and the sealed end lowermost for preventing leakage of liquid contained in the container.

Thus there is provided in accordance with the invention a novel and highly effective container and a method and apparatus of manufacturing it meeting the objects of the invention as outlined above. Many modifications of the preferred embodiment of the invention disclosed herein will readily occur to those skilled in the art. For example, while the use of ultrasonic energy is preferred for the welding process, other sources of energy can be substituted. Similarly, other materials can be substituted for the extruded plastic tubing and the injection-molded plastic stand. Moreover, the precise shape of the base 22 and tapered portion 24 of the cavity 20 is not critical, so long as the tapered portion 24 is adapted to fold the rim 14 in the manner described above and the base 22 is adapted to squeeze the folded rim 14 and slug 10 tightly against the mandrel 16. Accordingly, the invention is not limited except by the appended claims.

I claim:

1. A method of forming a bottom of a container for liquids, the method comprising the steps of:

effecting a relative movement between a length of extruded thermoplastic tubing, a thermoplastic slug, and a mandrel that results in the tubing being positioned around the mandrel, the tubing having a first portion that extends to the slug, a first open end that extends beyond the slug to form an annular rim, and a second open end which is opposite the first open end and which forms a top of the container, the slug being supported by the mandrel within the rim;

providing an ultrasonic resonating horn having a cavity adapted to receive the rim, the horn cavity having a base and an annular tapered portion formed around the base and engageable with the rim;

applying a relatively moderate force to the tubing and the resonating horn to press them together so that the tapered portion of the horn cavity engages the rim of the tubing and softens and folds it inwardly in such a manner that it is in alignment with the slug, the mandrel, and the base of the cavity;

applying a relatively large force to the mandrel and the resonating horn to press them together to squeeze the folded rim and the slug tightly together between the mandrel and the base of the cavity to form the bottom of the container without deforming the first portion of the tubing; and propagating ultrasonic waves from the horn into the folded rim and the slug to fuse the rim and the slug together and form a watertight seal at the end of the tubing.

2. A method according to claim 1 further comprising the step of providing an injection-molded stand engageable with the sealed end of the tubing for supporting the tubing in an upright position with an open end of the tubing uppermost for ingress and egress of a liquid and the sealed end lowermost for preventing leakage of liquid contained in the tubing.

3. A method according to claim 2 wherein the providing of the stand comprises the steps of:

placing an injection-molded stand in contact with the sealed end of the tubing;

inserting a mandrel into the tubing; and propagating ultrasonic waves into the stand around the sealed end of the tubing to fuse the stand and the sealed end together.

* * * * *